E. R. RICHTER.
POLARITY INDICATOR.
APPLICATION FILED JAN. 23, 1917.

1,256,258.

Patented Feb. 12, 1918.

Witness:
John Enders

Inventor:
Emil R. Richter,
by Robert Burns
Atty.

UNITED STATES PATENT OFFICE.

EMIL R. RICHTER, OF CHICAGO, ILLINOIS, ASSIGNOR TO HARVARD ELECTRIC COMPANY, OF CHICAGO, ILLINOIS, A CORPORATION OF ILLINOIS.

POLARITY-INDICATOR.

1,256,258.  Specification of Letters Patent.  Patented Feb. 12, 1918.

Application filed January 23, 1917. Serial No. 144,093.

*To all whom it may concern:*

Be it known that I, EMIL R. RICHTER, a citizen of the United States of America, and a resident of Chicago, in the county of Cook, State of Illinois, have invented certain new and useful Improvements in Polarity-Indicators, of which the following is a specification.

This invention relates more particularly to polarity indicators for battery circuits, and which are adapted to visibly indicate the direction as well as the absence of current in the line in which the instrument is placed.

And the present improvement has for its various objects:—

To provide a simple and efficient structural arrangement and combination of parts whereby distinct visible readings are displayed as to the absence of current and the two directions in which the current may be flowing along the line being tested.

To provide a simple and adjustable means for returning the indicating prism of instrument to a normal point indicating the "off" condition of the line when no current is flowing along the same.

To provide a general structural formation and association of the instrument parts, providing simplicity and economy in manufacture and accuracy and efficiency in operation, all as will hereinafter more fully appear and be more particularly defined in the claims.

In the accompanying drawing.

Similar reference numerals indicate like parts in the several views.

Figure 1:
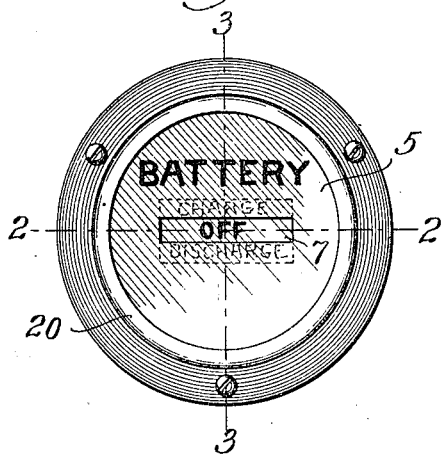
Figure 1, is a front elevation of a polarity indicator embodying the present invention.
Figure 4:
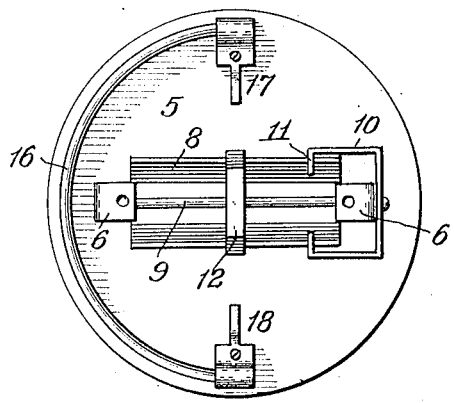
Fig. 4, is a detail bottom view of the dial plate and accessories.
Figure 2:
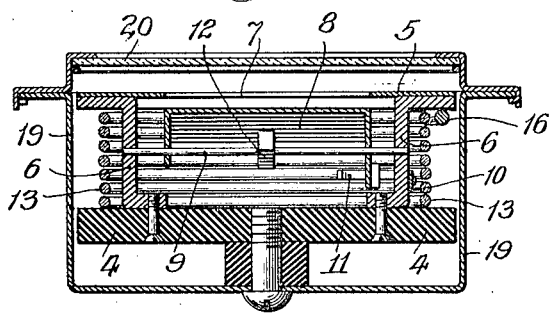
Fig. 2 is an enlarged section of the same, on line 2—2, Fig. 1.

Referring to the drawing, 4 designates the base plate, and 5 the dial plate of the instrument, secured in spaced relation, preferably by intermediate legs 6, which are formed by strips of metal displaced in the formation of the elongated visual orifice 7 of said dial plate 5. In the present structure the aforesaid visual orifice 7 is preferably arranged horizontally in said dial plate, and above said orifice the dial plate will preferably carry the word or legend "Battery" as shown in Fig. 1.

8 designates the indicating prism of the structure, formed with three flat facets or faces, the central facet carrying the legend "Off" and the side facets carrying the legends "Charge" and "Discharge" respectively as indicated in Fig. 1. The indicating prism 8 is formed of sheet material, preferably aluminum, and carries a longitudinally extending rod 9 by which it is pivoted in the aforesaid legs 6, to turn past the visual orifice 7 aforesaid, and display therethrough one or the other of the legends above described.

10 designates a stop member or bracket secured to one of the legs 6, and having a pair of lateral stop extensions 11 projecting into the path of the indicating prism 8 and adapted to limit the turning movements of the same in either direction past the visual orifice 7 in the various movements of said prism in actual use.

12 designates a straight bar magnet secured near the mid-length of the indicating prism 8 and extending transversely of the same as shown.

Figure 5:
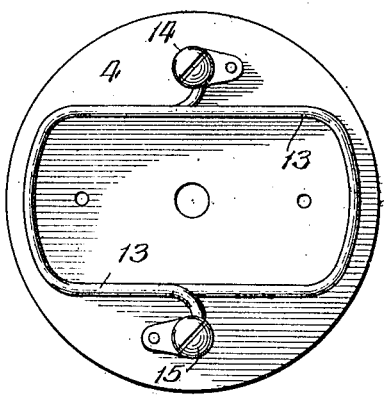
Fig. 5, is a detail top view illustrating the coil and its attachment to the base plates of the instrument.
Figure 3:
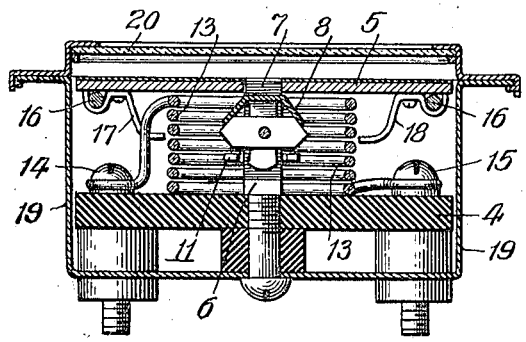
Fig. 3, is a similar view on line 3—3, Fig. 1.

13 designates the influencing coil, preferably of the approximately square form shown in Fig. 5, and inclosing the indicating prism 8 and associated bar magnet 12 aforesaid. Said coil 13 is connected at its respective ends to terminal posts 14, 15 on the base plate 4, so as to be capable of ready connection with the line wire to which the instrument is to be applied.

16 designates a semi-circular bar magnet secured to the underside of the dial plate 5, and provided with pole pieces 17 and 18 extending inward toward the respective poles of the bar magnet 12 associated with the indicating prism 8. In the present improvement said pole pieces are in the form of separate bracket pieces adapted to engage and hold the bar magnet 16 in place on the underside of the dial plate 5, and a ductile or bendable metal will be employed in making said bracket pieces so that their extensions aforesaid, are adapted for independent adjustment with relation to the ends of the bar magnet 12, in order to adjust the point of stoppage of the indicating prism 8 associated with said magnet 12, when no current is in the circuit. The function of the semi-circular magnet 16 is to produce eddy currents therein when the bar magnet 12 is rotated and said magnet 16 has no effect upon the indications of the instrument, other than that of damping the oscillations and bringing the moving parts promptly to rest, as usual in many forms of electrical measuring instruments in general use.

19 designates a shell or housing inclosing the mechanism above described, and provided with a removable cover, 20, the front of which is glazed or rendered transparent by any other usual means.

Having thus fully described my said invention what I claim as new and desire to secure by Letters Patent, is:—

1. A polarity indicator comprising, a base plate, a dial plate having an elongated visual orifice, connecting legs imposing spaced relation of said plates, an indicating prism revolubly mounted on said legs beneath the aforesaid orifice and provided with a plurality of flat legend carrying facets, a transverse magnetic bar mounted centrally on said prism, and a coil mounted on the base plate and encircling said prism and magnetic bar, substantially as set forth.

2. A polarity indicator comprising, a base plate, a dial plate having an elongated visual orifice arranged horizontally, connecting legs formed by metal strips displaced in forming said visual orifice, an indicating prism revolubly mounted on said legs beneath the aforesaid orifice and provided with a plurality of flat legend carrying facets, a transverse magnetic bar mounted centrally on said prism, and a coil mounted on the base plates and encircling said prisms and magnetic bar, substantially as set forth.

3. A polarity indicator comprising, a base plate, a dial plate having an elongated visual orifice, connecting legs imposing spaced relation of said plates, an indicating prism revolubly mounted on said legs beneath the aforesaid orifice and provided with a plurality of flat legend carrying facets, a transverse magnetic bar mounted centrally on said prism, a coil mounted on the base plate and encircling said prism and magnetic bar, and a bracket piece secured to a leg aforesaid and provided with stop extensions projecting into the path of the indicating prism, substantially as set forth.

4. A polarity indicator comprising, a base plate, a dial plate having an elongated visual orifice, connecting legs imposing spaced relation on said plates, an indicating prism revolubly mounted on said legs beneath the aforesaid orifice and provided with a plurality of flat legend carrying facets, a transverse magnetic bar mounted centrally on said prism, a coil mounted on the base plate and encircling said prism and magnetic bar, a semi-circular magnetic bar associated with said dial plate, and ductile pole pieces for said magnetic bar and extending inwardly into adjacent relation to the polar ends of the magnetic bar of the indicating prism, substantially as set forth.

5. A polarity indicator comprising a base plate, a dial plate having an elongated visual orifice, connecting legs imposing spaced relation on said plates, an indicating prism revolubly mounted on said legs beneath the aforesaid orifice and provided with a plurality of flat legend carrying facets, a transverse magnetic bar mounted centrally on said prism, a coil mounted on the base plate and encircling said prism and magnetic bar, a semi-circular magnetic bar, and brackets securing said magnetic bar to the underside of the dial plate and having inward extensions forming inwardly projecting pole pieces having adjacent relation to the polar ends of the magnetic bar of the indicating prism, substantially as set forth.

Signed at Chicago, Illinois, this 10th day of January, 1917.

EMIL R. RICHTER.